United States Patent
Byun

(10) Patent No.: US 11,526,438 B2
(45) Date of Patent: Dec. 13, 2022

(54) MEMORY SYSTEM CAPABLE OF INCREASING STORAGE EFFICIENCY AND OPERATION METHOD THEREOF

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 169 days.

(21) Appl. No.: 17/002,210

(22) Filed: Aug. 25, 2020

(65) Prior Publication Data

US 2021/0157723 A1    May 27, 2021

(30) Foreign Application Priority Data

Nov. 25, 2019  (KR) .................. 10-2019-0152272

(51) Int. Cl.
  *G06F 12/02*  (2006.01)
  *G06F 12/0891*  (2016.01)
  *G06F 12/0882*  (2016.01)

(52) U.S. Cl.
  CPC ...... *G06F 12/0261* (2013.01); *G06F 12/0246* (2013.01); *G06F 12/0882* (2013.01); *G06F 12/0891* (2013.01)

(58) Field of Classification Search
  CPC ............. G06F 12/0261; G06F 12/0246; G06F 12/0882; G06F 12/0891; G06F 2212/7205; G06F 12/0253; G06F 3/064; G06F 3/0652; G06F 3/0658; G06F 2212/1016
  See application file for complete search history.

(56) References Cited

U.S. PATENT DOCUMENTS

| 10,101,942 | B1* | 10/2018 | Parker | G06F 12/0246 |
| 10,997,039 | B2* | 5/2021 | Koo | G06F 12/0246 |
| 2013/0166824 | A1* | 6/2013 | Shim | G06F 12/0246 |
| | | | | 711/E12.008 |
| 2016/0070593 | A1* | 3/2016 | Harris | G06F 9/45558 |
| | | | | 718/106 |
| 2017/0235486 | A1* | 8/2017 | Martineau | G06F 3/064 |
| | | | | 711/103 |
| 2018/0018091 | A1* | 1/2018 | Shin | G11C 16/16 |
| 2018/0190329 | A1* | 7/2018 | Kathawala | G06F 12/0246 |
| 2018/0307598 | A1* | 10/2018 | Fischer | G06F 3/0643 |
| 2018/0341557 | A1* | 11/2018 | Koo | G06F 3/0619 |
| 2019/0087328 | A1* | 3/2019 | Kanno | G06F 3/0688 |
| 2019/0087349 | A1* | 3/2019 | Chung | G06F 3/0631 |
| 2020/0264973 | A1* | 8/2020 | Lee | G06F 12/0246 |
| 2021/0223954 | A1* | 7/2021 | Yang | G06F 3/061 |

FOREIGN PATENT DOCUMENTS

| KR | 10-1356470 | 1/2014 |
| KR | 10-2019-0044798 | 5/2019 |

* cited by examiner

*Primary Examiner* — Sean D Rossiter
(74) *Attorney, Agent, or Firm* — IP & T Group LLP

(57) ABSTRACT

An operation method of a controller, comprising: selecting a target super block, on which garbage collection (GC) is to be performed, among a plurality of super blocks which are completely programmed, based on a first valid page count of each of the super blocks when a determination to perform GC is made; selecting a first target block among a plurality of memory blocks in the target super block based on a second valid-page decrease amount of each of the memory blocks; and performing a first copy operation on valid pages in the first target block.

25 Claims, 15 Drawing Sheets

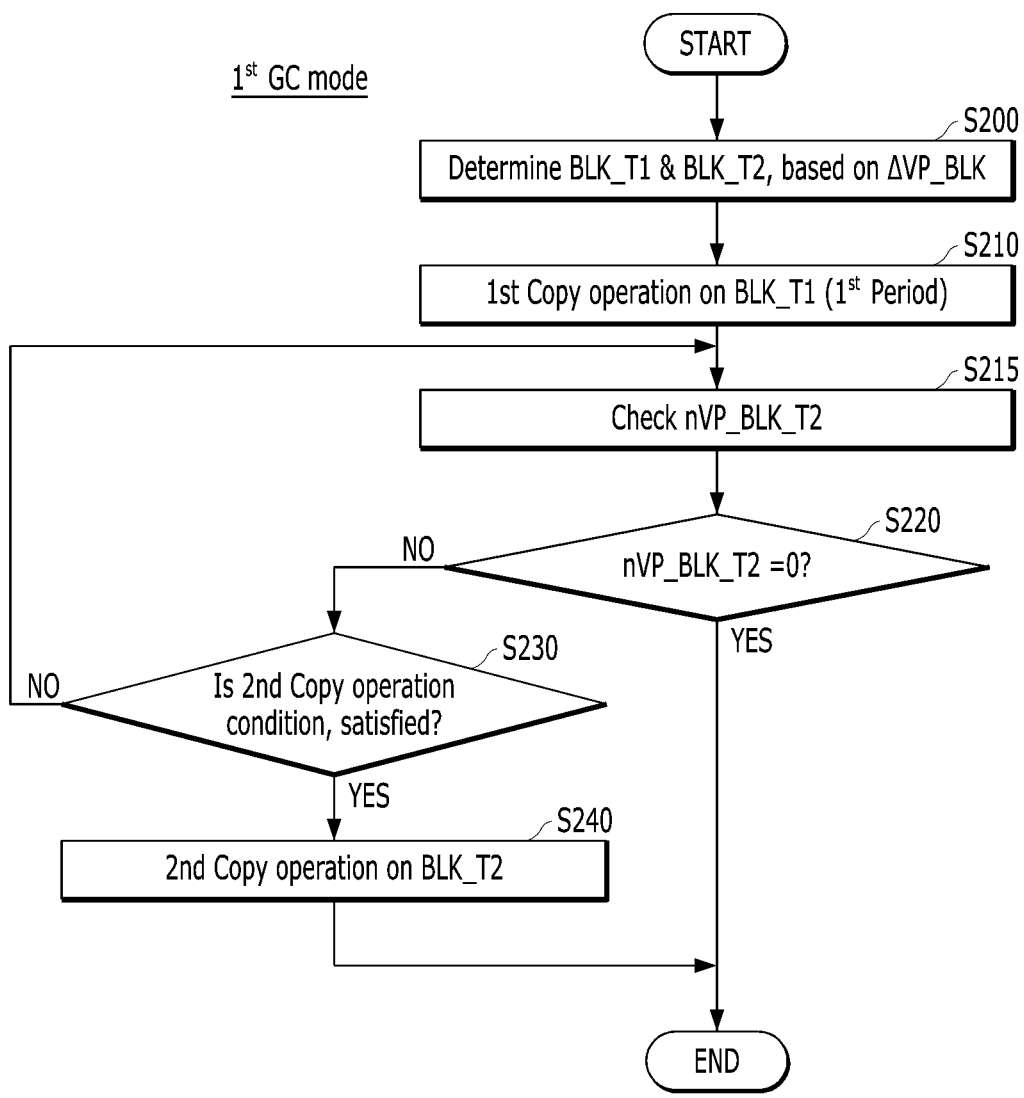

FIG. 9 nVP TABLE

| INDEX | | TP 1 | | TP 2 | |
|---|---|---|---|---|---|
| | | nVP_BLK | nVP_SB1 | nVP_BLK | nVP_SB1 |
| SB1 | PL1_BLK1 | 3 | 30 | 3 | 21 |
| | PL2_BLK1 | 4 | | 4 | |
| | PL3_BLK1 | 4 | | 3 | |
| | PL4_BLK1 | 19 | | 11 | |

ΔVP TABLE

| INDEX | | TP 2 | |
|---|---|---|---|
| | | ΔVP_BLK | ΔVP_SB1 |
| SB1 | PL1_BLK1 | 0 | -9 |
| | PL2_BLK1 | 0 | |
| | PL3_BLK1 | -1 | |
| | PL4_BLK1 | -8 | |

MEMORY SYSTEM CAPABLE OF INCREASING STORAGE EFFICIENCY AND OPERATION METHOD THEREOF

CROSS-REFERENCE TO RELATED APPLICATION

This application claims priority under 35 U.S.C. § 119 to Korean Patent Application No. 10-2019-0152272, filed on Nov. 25, 2019, which is incorporated herein by reference in its entirety.

BACKGROUND

1. Field

Various embodiments relate to a memory system and an operation method thereof, and more particularly, to a memory system capable of increasing the storage efficiency of a memory device, and an operation method thereof.

2. Discussion of the Related Art

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, exemplary data storage devices include a USB (Universal Serial Bus) memory device, a memory card having various interfaces, a solid state drive (SSD) and the like.

SUMMARY

Various embodiments are directed to a memory system which can set priorities of valid data migration operations on memory blocks differently based on valid-page decrease amounts of the respective memory blocks, and thus reduce the number of valid pages in a memory block of low priority thereby reducing the burden imposed on the system by the migration operation and the time required for the migration operation, and an operation method thereof.

Also, various embodiments are directed to a memory system capable of determining the mode of Garbage Collection (GC) based on the invalidation rate of a memory device, and an operation method thereof.

Also, various embodiments are directed to a memory system which can select a super block as a target of the GC thereby improving the operation efficiency of a great-capacity memory device, and an operation method thereof.

In accordance with an embodiment, an operation method of a controller, comprising: selecting a target super block, on which garbage collection (GC) is to be performed, among a plurality of super blocks which are completely programmed, based on a first valid page count of each of the super blocks when a determination to perform GC is made; selecting a first target block among a plurality of memory blocks in the target super block based on a second valid-page decrease amount of each of the memory blocks; and performing a first copy operation on valid pages in the first target block.

The operation may further comprise calculating a second valid page count of each of the memory blocks whenever the determination to perform the GC is made, the second valid page counts of the respective memory blocks having being recently calculated two or more times; and calculating a second valid-page decrease amount of each of the memory blocks based on the second valid page count of the corresponding memory block.

The operation may further comprise calculating a first count of valid pages in each of the memory blocks when a determination to perform a current GC is made; and calculating the second valid-page decrease amount of each of the memory blocks based on the first count and a second count, The second count represents the number of valid pages in the corresponding memory block when a determination to perform a previous GC is made.

The operation may further comprise checking a second valid page count of a second target block, among the plurality of memory blocks, after the first copy operation is completed.

The operation may further comprise determining the target super block as an erase target super block, without performing a second copy operation on valid pages in the second target block, when the second valid page count of the second target block may be '0'.

The operation may further comprise performing a second copy operation on valid pages in the second target block after a threshold time elapses from completion of the first copy operation; and determining the target super block as an erase target super block.

The second copy operation is performed when the second valid page count of the second target block may be equal to or more than 1 and less than a threshold value.

The operation may further comprise performing an erase operation on the erase target super block.

The second valid-page decrease amount of the first target block may be less than a reference value, and the second valid-page decrease amount of the second target block may be equal to or more than the reference value.

Among the plurality of memory blocks, the second target block may have the greatest second valid-page decrease amount.

In accordance with an embodiment, An operation method of a memory system having memory device, comprising: selecting a target super block on which garbage collection (GC) is to be performed, among a plurality of closed super blocks, based on a first valid page count of each of the super blocks when a determination to perform the GC is made; designating each of a plurality of memory blocks in the target super block as a first target block or a second target block based on a second valid-page decrease amount of each of the memory blocks, when an invalidation rate of valid pages in the memory device is low; and performing a first copy operation on the first target block before performing a second copy operation on the second target block.

The operation may further comprise calculating a second valid page count of each of the memory blocks whenever the determination to perform the GC is made, the second valid page counts of the respective memory blocks being recently calculated two or more times; and calculating a second valid-page decrease amount of each of the memory blocks based on the second valid page count of the corresponding memory block.

The operation may further comprise calculating a first count of valid pages in each of the memory blocks when a determination to perform a current GC is made; and calculating the second valid-page decrease amount of each of the memory blocks based on the first count and a second count, wherein the second count represents the number of valid pages in the corresponding memory block when a determination to perform a previous GC is made.

The operation may further comprise determining the target super block as an erase target super block, without performing the second copy operation on valid pages in the second target block, when the second valid page count of the second target block may be '0'.

The operation may further comprise performing the second copy operation on valid pages in the second target block after a threshold time elapses from completion of the first copy operation; and determining the target super block as an erase target super block.

The second copy operation is performed when the second valid page count of the second target block may be equal to or more than 1 and less than a threshold value.

The operation may further comprise performing an erase operation on the erase target super block.

The second valid-page decrease amount of the first target block may be less than a reference value, and the second valid-page decrease amount of the second target block may be equal to or more than the reference value.

Among the plurality of memory blocks, the second target block may have the highest valid-page decrease amount.

The invalidation rate of valid pages in the memory device may be determined based on one or more of a valid-page decrease of each of the super blocks, the number of programmable pages in free super blocks, and the size of data on which a program operation is to be performed.

The operation may further comprise performing a copy operation on the target super block when the invalidation rate of valid pages in the memory device may be high; and determining the target super block as an erase target super block.

In accordance with an embodiment, a memory system comprising: a memory device comprising a plurality of super blocks each including a plurality of memory blocks; and a controller suitable for selecting a first target block among a plurality of memory blocks included in a target super block, on which garbage collection (GC) is to be performed, and performing a first copy operation on the first target block, when a determination to perform the GC is made, wherein the controller selects the target super block based on a first valid page count of each of the super blocks, and wherein the controller selects the first target block based on a second valid-page decrease amount of each of the plurality of memory blocks in the target super block.

The controller may calculate the second valid-page decrease amount of each of the memory blocks whenever the determination to perform the GC is made, based on a second valid page count of each of the corresponding memory block in the target super block, the second valid page counts of the respective memory blocks being recently calculated two or more times.

The controller may calculate a first count of valid pages in each of the memory blocks in the target super block when a determination to perform a current GC is made and calculates the second valid-page decrease amount of each of the memory blocks based on the first count and a second count, wherein the second count represents the number of valid pages in the corresponding memory block in the target super block when a determination to perform a previous GC is made.

The controller may check a second valid page count of a second target block, among the plurality of memory blocks, after the first copy operation is completed.

The controller may determine the target super block as an erase target super block, without performing a second copy operation on valid pages in the second target block, when the second valid page count of the second target block may be '0'.

The controller is further suitable for: performing a second copy operation on valid pages included in the second target block after a threshold time elapses from completion of the first copy operation; and determining the target super block as an erase target super block.

The controller may perform the second copy operation when the second valid page count of the second target block may be equal to or more than 1 and less than a threshold value.

The second valid-page decrease amount of the first target block may be less than a reference value, and the second valid-page decrease amount of the second target block may be equal to or more than the reference value.

Among the plurality of memory blocks in the target super block, the second target block may have the greatest valid-page decrease amount.

In accordance with an embodiment, an operating method of a controller, the operating method comprising: determining, within a super block, one or more first target memory blocks and one or more second target memory blocks; controlling a memory device to perform a garbage collection operation on valid pages in the one or more first target memory blocks; and controlling the memory device to perform a garbage collection operation on one or more valid pages, which remain in the one or more second target memory blocks at a set time after completion of the garbage collection operation on the one or more first target memory blocks, wherein each of the first target memory blocks has a valid-page decrease rate less than a threshold, and wherein each of the second target memory blocks has a valid-page decrease rate equal to or greater than the threshold.

BRIEF DESCRIPTION OF THE DRAWINGS

FIG. 7 is a flowchart illustrating a method for performing GC in accordance with an embodiment.

FIG. 9 is a diagram illustrating the numbers of valid pages managed for respective memory blocks and valid page decrease amounts of the memory blocks.

DETAILED DESCRIPTION

Embodiments are described in detail below with reference to the accompanying drawings. It should be understood that the following description primarily focuses on aspects and features of the invention; description of well-known material is omitted so as not to unnecessarily obscure subject matters of the present invention. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Figure 1A:
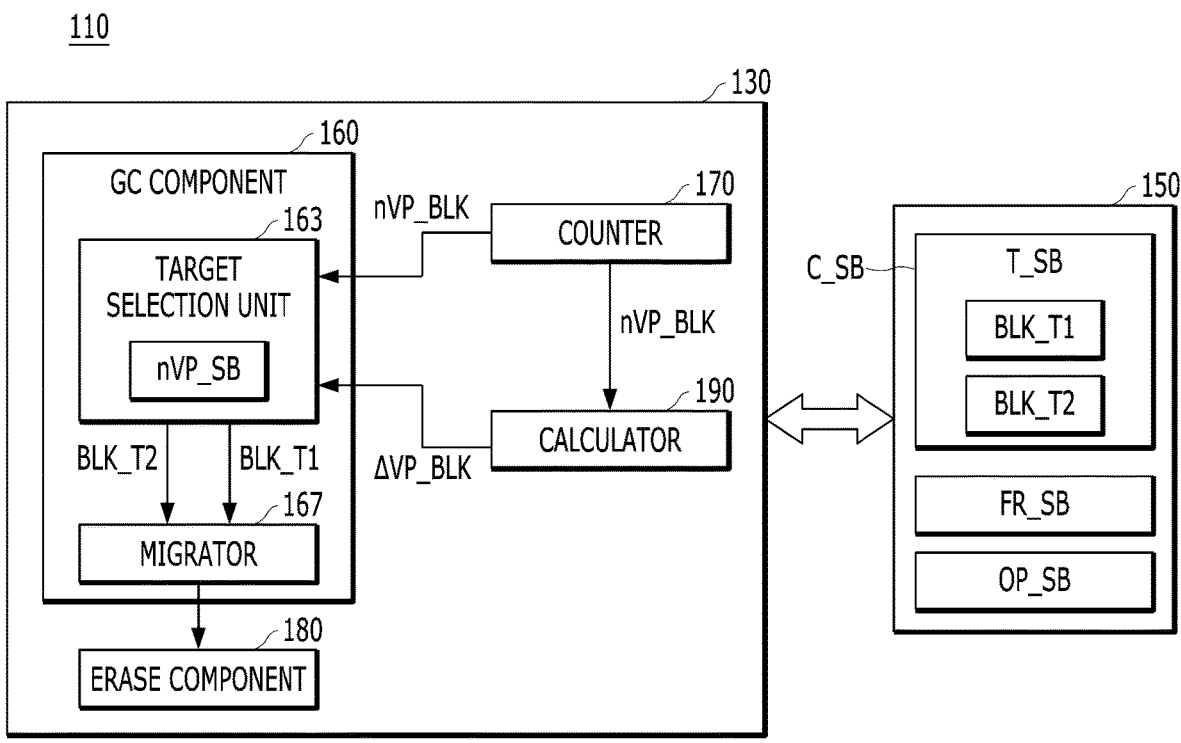
FIGS. 1A and 1B are diagram and flowchart, respectively, for describing a memory system in accordance with an embodiment and an operation performed by the memory system.
Figure 1B:
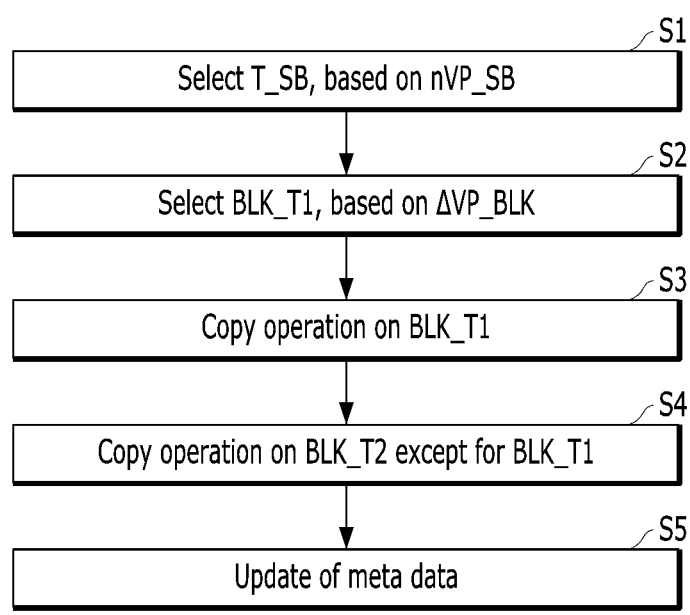

FIG. 1A illustrates an example of a memory system 110 which performs Garbage Collection (GC) in accordance with an embodiment. FIG. 1B illustrates a method in which the memory system 110 illustrated in FIG. 1A performs GC. Referring to FIGS. 1A and 1B, the memory system in accordance with the present embodiment and a GC process performed by the memory system is described.

As illustrated in FIG. 1A, the memory system 110 may include a controller 130 and a memory device 150.

The memory device 150 may include a plurality of super blocks each including a plurality of memory blocks. The plurality of super blocks may include a target super block T_SB, an open super block OP_SB and a free super block FR_SB.

In the present embodiment, the number of valid pages included in a super block SB is simply referred to as 'first valid page count nVP_SB'. In the present embodiment, the number of valid pages included in a memory block BLK within the super block SB is simply referred to as 'second valid page count nVP_BLK'. In the present embodiment, a decrease amount of valid pages included in the super block SB is simply referred to as 'first valid-page decrease amount ΔVP_SB'. In the present embodiment, a decrease amount of valid pages included in the memory block BLK is simply referred to as 'second valid-page decrease amount ΔVP_BLK'.

In the present embodiment, the target super block T_SB on which GC is to be performed may have a first valid page count nVP_SB less than a set target value. The target super block T_SB may have the fewest valid pages among closed super blocks which have been completely programmed.

Valid data and invalid data may be distributed in the target superblock T_SB. The invalid data stored in the target super block T_SB may include data whose logical address is changed or unassigned by a host request. In this case, the controller 130 may perform a migration operation of valid data stored in the target super block T_SB, and then perform an erase operation on the target super block T_SB, thereby securing the target super block T_SB as a free super block FR_SB. The target super block T_SB corresponding to the target of GC may be referred to as a source super block or a victim super block.

The free super block FR_SB may be a super block including only erased pages from which data have been erased. The open super block OP_SB may include erased pages and programmed pages having data programmed therein. In the present embodiment, a super block including erased pages to which data can be programmed may be referred to as the open super block OP_SB. Furthermore, the free super block FR_SB may be used as the open super block OP_SB for a program operation on the free super block FR_SB. That is, the open super block OP_SB may be a super block including erased pages to which new data can be programmed. A memory block included in the super block may include a plurality of pages, and the minimum unit on which an erase operation is performed is a memory block. Furthermore, a page included in a memory block may include a plurality of nonvolatile memory cells, and the minimum unit on which a program operation is performed is a page.

When the program operation is completed on all pages included in the super block, the super block may be changed from an open super block to a closed super block. The closed super block may include only programmed pages and to which no new data can be programmed without first performing an erase operation.

As the size of data requested by the host continues to increase, the memory system 110 performs a program operation, a read operation, and a read operation on a super block basis, in order to increase the operation efficiency thereof. The super block may be a group of memory blocks having physical locations where a program operation and a read operation can be performed in an interleaving manner. The memory system 110 may also perform a background operation on a super block basis, in order to increase the efficiency of the background operation and to reduce the size of meta data (for example, state information and map data) of the super block. Therefore, the controller 130 in accordance with the present embodiment may select a target super block T_SB, on which GC is to be performed. That is, GC may be performed on a super block basis.

The GC in accordance with the present embodiment may include checking first valid page counts nVP_SB of respective close super blocks after it is decided that the GC operation will be performed. The GC may further include selecting the target super block T_SB based on the first valid page counts nVP_SB of the respective close super blocks. The GC may further include migrating valid data which are scattered in the target super block T_SB. The migration operation of valid data may include copying valid data from the target super block T_SB into a free area in which data can be stored. The migration operation may include updating meta data (for example, L2P map data) of an area programmed by the copy operation. The target super block T_SB whose migration operation has been completely performed may be invalidated. The invalidated target super block T_SB may become an erase target super block. The GC in accordance with the present disclosure may further include erasing the target super block T_SB whose valid data have been completely migrated for securing free blocks.

The GC in accordance with the present embodiment may be automatically (auto GC) or manually (manual GC), depending on the device that performs the GC. In the case of auto GC, a controller may determine to perform GC without a request of the host. In the case of manual GC, the host interworking with the memory system may sense the operation state of the memory system and request the memory system to perform GC. The auto GC may include run-time GC which is performed when a data storage space (for example, the number of free super blocks) is insufficient while a data program operation is performed, and idle GC which is performed on a super block whose first valid page count nVP_SB is relatively low while the memory system is idle. In accordance with the present embodiment, the controller 130 may determine to perform the GC at a set frequency, i.e., at fixed time periods.

By way of example, the present embodiment is described in the context in which one valid page can store a single piece of data and thus the number of valid pages is equal to the number of pieces of valid data. However, the present invention is not limited thereto.

The controller 130 in accordance with the present embodiment may migrate valid data on each of the memory blocks at different time points based on the second valid-page decrease amount ΔVP_BLK of each memory block included in the target super block T_SB on which GC is to be performed. This may indicate that the migration operation of valid data are performed on the respective memory blocks in the target super block T_SB at different time points, based on a decrease amount of valid pages of the respective memory blocks. For this operation, the controller 130 may perform a migration operation of a first target block BLK_T1 prior to performing a migration operation of a second target block BLK_T2. The second valid-page decrease amount ΔVP_BLK of the first target block BLK_T1 is less than a reference value, which may be set in advance. The second valid-page decrease amount ΔVP_BLK of the second target block BLK_T2 is equal to or more than the reference value.

Thus, while the migration operation is performed on the first target block BLK_T1, valid pages included in the second target block BLK_T2 are highly likely to be invalidated. That is, the valid pages included in the second target block BLK_T2 may be highly likely to be exhausted and thus the second valid page count nVP_BLK of the second target block BLK_T2 may be highly likely to be reduced since the second valid-page decrease amount ΔVP_BLK of the second target block BLK_T2 is relatively great. Therefore, as the second valid page count nVP_BLK of the second target block BLK_T2 is decreased, the time required for the migration operation performed on the target super block T_SB may be reduced.

In the present invention, the number and amount may be used in the similar meaning. For, example, an increase in number may mean an increase in quantity, and a decrease in number may mean a decrease in quantity.

As a physical address indicating the storage location of valid data corresponding to a logical block is changed due to the completed GC, a physical address of a physical block may be invalidated. The controller 130 may update map data to map the changed physical address to a logical address instead of the invalidated physical address, and thus keep the map data up-to-date. Therefore, the controller 130 may perform an operation on the memory device 150 using a mapping table which is kept up-to-date through map data management, thereby improving the operation speed of the memory device 150.

As illustrated in FIG. 1A, the controller 130 may include a GC component 160, a counter 170, a calculator 190 and an erase component 180. The counter 170 may maintain the second valid page count nVP_BLK of each memory blocks BLK in the memory device 150. Whenever the second valid page count nVP_BLK of each memory block BLK is changed, the counter 170 may update the second valid page count nVP_BLK of the corresponding memory block BLK.

The calculator 190 may calculate the second valid-page decrease amount ΔVP_BLK of the respective memory blocks BLK in the target super block T_SB under control of the controller 130. When the target super block T_SB is selected after a determination to perform GC is made, the controller 130 may control the calculator 190 to calculate the second valid-page decrease amount ΔVP_BLK of the respective memory blocks BLK in the target super block T_SB. The calculator 190 may calculate the second valid-page decrease amount ΔVP_BLK of the respective memory blocks BLK in the target super block T_SB, based on the second valid page count nVP_BLK of the memory blocks, which are received from the counter 170 whenever a determination to perform GC is made.

The GC component 160 may include a target selector 163 and a data migrator 167.

The target selector 163 may select the target super block T_SB among the plurality of closed super blocks, based on the first valid page count nVP_SB of each super block SB. For this operation, the target selector 163 may calculate the first valid page count nVP_SB by summing up the second valid page counts nVP_BLK of the memory blocks BLK, received from the counter 170, on a super block basis.

The target selector 163 may sort the plurality of memory blocks BLK, included in the target super block T_SB, into first and second target blocks BLK_T1 and BLK_T2 based on the second valid-page decrease amount ΔVP_BLK of each of the memory blocks BLK. In the present embodiment, the first target block BLK_T1 may be a memory block BLK which is highly unlikely to be invalidated, and the second target block BLK_T2 may be a memory block which is highly likely to be invalidated. The likelihood that the memory block BLK will be invalidated may be determined based on the second valid-page decrease amount ΔVP_BLK of each memory block BLK in the target super block T_SB during N recently performed GC operations, where N is a natural number equal to or more than '2'.

Among the plurality of memory blocks BLK in the target super block T_SB, the target selector 163 may select, as the first target block BLK_T1, the memory block BLK whose second valid-page decrease amount ΔVP_BLK is less than the reference value.

Among the plurality of memory blocks BLK in the target super block T_SB, the target selector 163 may select, as the second target block BLK_T2, the memory block BLK whose second valid-page decrease amount ΔVP_BLK is equal to or more than the reference value. Among the plurality of memory blocks BLK included in the target super block T_SB, the target selector 163 may select, as the second target block BLK_T2, at least one memory block BLK having the greatest second valid-page decrease amount ΔVP_BLK. The target selector 163 may select the other memory blocks BLK as the first target blocks BLK_T1.

The data migrator 167 may migrate the valid data from the first target block BLK_T1 and the second target block BLK_T2 to the free super block FR_SB or the open super block OP_SB.

The data migrator 167 in accordance with the present embodiment may perform the migration operation of valid data on the first target block BLK_T1 before performing such operation on the second target block BLK_T2. During a first period in which the migration operation is performed on the first target block BLK_T1, at least some of valid pages in the second target block BLK_T2 may be invalidated. Thus, the data migrator 167 can reduce the number of valid pages on which the migration operation needs to be performed, by the number of valid pages, which become invalidated in the second target block BLK_T2 during the first period. When the second valid page count nVP_BLK of the second target block BLK_T2 is '0' because all valid pages in the second target block BLK_T2 were invalidated during the first period, the data migrator 167 does not need to perform the migration operation on the second target block BLK_T2. Therefore, the memory system 110 in accordance with the present embodiment can reduce the burden of the migration operation on the second target block BLK_T2 when GC is performed.

The erase component 180 in accordance with the present embodiment may perform an erase operation on the target super block T_SB on which the controller 130 has determined to perform the erase operation after GC was performed, under control of the controller 130. When the memory device 150 is in an idle state or a storage space for performing a program operation based on a write request received from the host is insufficient, the controller 130 may control the erase component 180 to perform an erase operation on the target super block T_SB.

FIG. 1B illustrates a method in which the memory system 110 illustrated in FIG. 1A performs GC.

Referring to operation S1 of FIG. 1B, the memory system 110 may select the target super block T_SB among the plurality of super blocks SB, based on the first valid page count nVP_SB of each of the super blocks SB, in operation S1.

After operation S1, the memory system 110 may select the first target block BLK_T1 among the plurality of memory blocks BLK in the target super block T_SB, based on the second valid-page decrease amounts ΔVP_BLK of the respective memory blocks BLK in the target super block T_SB, in operation S2.

After operation S2, the memory system 110 may copy valid data from the first target block BLK_T1 to a free super block FR_SB or an open super block OP_SB in operation S3.

In operation S4, the memory system 110 may copy valid data from the second target blocks BLK_T2 to the free super block FR_SB or the open super block OP_SB, after operation S3. In operation S4, if no valid pages are in the second target blocks BLK_T2, the memory system 110 may not perform the copy operation of valid data.

Thus, the memory system 110 in accordance with the present embodiment may perform the copy operation of valid data on the second target blocks BLK_T2 after the copy operation of valid data on the first target block BLK_T1, which makes it possible to expect that all or some of the valid pages in the second target blocks BLK_T2 may be invalidated. That is, since the second valid page count nVP_BLK of the second target blocks BLK_T2 are reduced, the burden of the copy operation on the second target blocks BLK_T2 and the time to perform the copy operation of data can be reduced.

However, when the memory system 110 does not perform the copy operation on the second target blocks BLK_T2 until the second valid page count nVP_BLK of the second target blocks BLK_T2 become zero, the time at which the GC of the target super block T_SB is performed may be indefinitely postponed.

Thus, after the copy operation of the first target block BLK_T1 is completed, the memory system 110 may trigger a copy operation of the second target block BLK_T2 based on the second valid page count nVP_BLK of the second target block BLK_T2, a set time after the completion of the copy operation of the first target block BLK_T1 (waiting time), or when the number of valid pages in the memory device 150 during the copy operation on the first target block BLK_T1 decreases a certain amount.

For example, the memory system 110 may wait to perform the copy operation on the second target block BLK_T2 until the second valid page count nVP_BLK of the second target block BLK_T2 becomes less than a threshold value after the completion of the copy operation of the first target block BLK_T1.

The memory system 110 may wait to perform the copy operation of the second target block BLK_T2 until the waiting time becomes a threshold time after the completion of the copy operation of the first target block BLK_T1.

The memory system 110 may wait to perform the copy operation of the second target block BLK_T2 when the decrease amount of valid pages of the memory device 150 is less than a threshold amount during the copy operation of the first target block BLK_T1. The memory system 110 may perform the copy operation of the second target block BLK_T2 without waiting when the decrease amount of valid pages of the memory device 150 becomes greater than or equal the threshold amount during the copy operation of the first target block BLK_T1.

After the copy operation of the first target block BLK_T1 and the second target block BLK_T2 are performed, the memory system 110 may update meta data based on the copy operation of valid data performed in operations S3 and S4, in operation S5.

Therefore, the memory system 110 in accordance with the present embodiment may adjust the performance interval between the copy operation of valid data performed on the first and second target blocks BLK_T1 and BLK_T2, respectively, such that the time to perform the copy operation on the target super block T_SB falls within a specific range. Thus, it is possible to prevent or reduce overhead which occurs when GC is performed.

Figure 2:
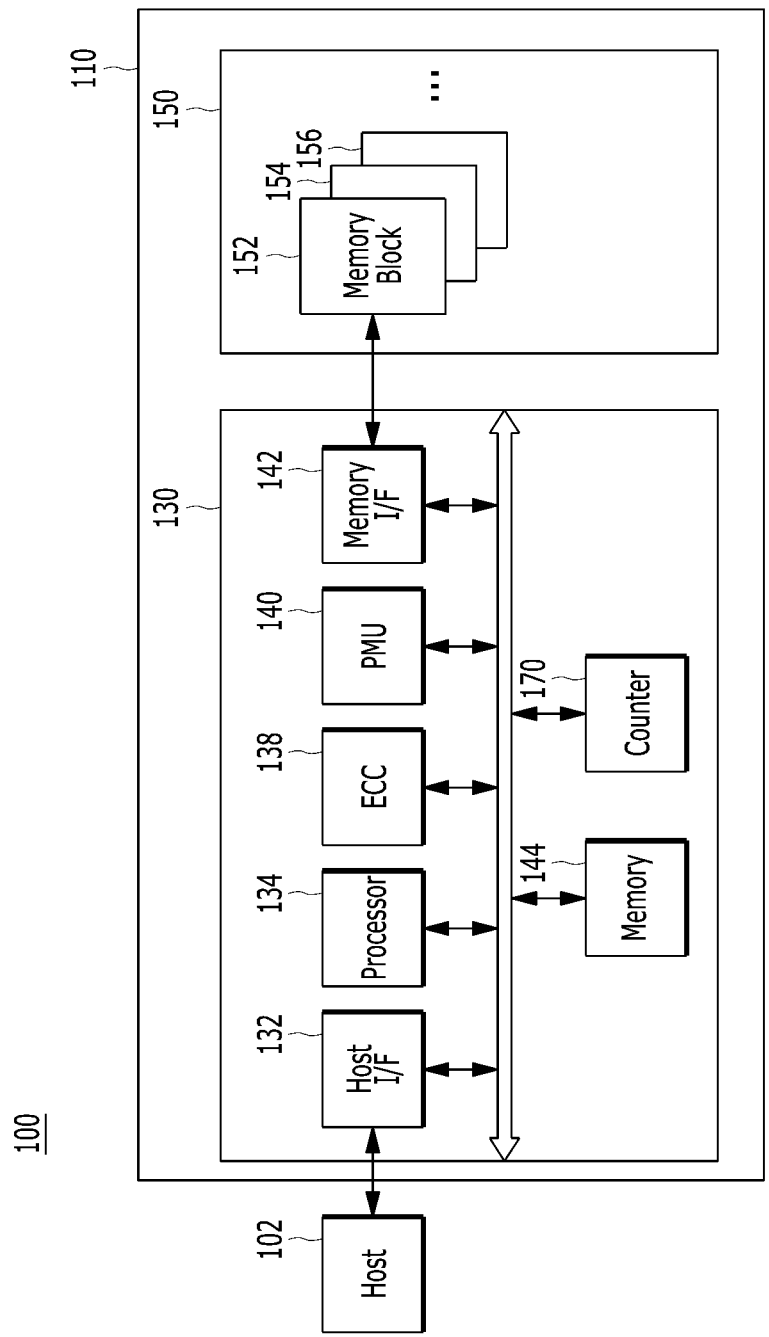
FIG. 2 is a schematic diagram illustrating a data processing system in accordance with an embodiment of the present invention.

FIG. 2 is a block diagram illustrating a data processing system 100 in accordance with an embodiment of the present invention.

Referring to FIG. 2, a data processing system 100 may include a host 102 operably engaged with a memory system 110.

The host 102 may include, for example, any of various portable electronic devices such as a mobile phone, an MP3 player and a laptop computer, or an electronic device such as a desktop computer, a game player, a television (TV), a projector, and/or the like.

The host 102 also includes at least one operating system (OS), which generally manages and controls functions and operations performed in the host 102. The OS can provide interoperability between the host 102 engaged with the memory system 110 and the user of the memory system 110. The OS may support functions and operations corresponding to a user's requests. By way of example but not limitation, the OS can be a general operating system or a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems with the memory system 110, corresponding to a user's request. The host 102 may transmit a plurality of commands corresponding to the user's requests to the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid-state drive (SSD), a multimedia card (MMC) of an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage device(s) for the memory system 110 may be implemented with a volatile memory device, for example, a dynamic random-access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and/or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above in the examples.

By way of example but not limitation, the controller 130 and the memory device 150 may be integrated into an SSD for improving an operation speed. When the memory system 110 is used as an SSD, the operating speed of the host 102 connected to the memory system 110 can be improved more than that of the host 102 implemented with a hard disk. In another embodiment, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC micro), a SD card (SD, mini SD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even without electrical power being supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be embodied in a three-dimensional stack structure.

The controller 130 may control overall operation of the memory device 150, as well as specific operations such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI), and/or integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit(s) of the read data. When the number of the error bits is greater than or equal to a threshold of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of a NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data received from the host 102 in the memory device 150. The memory 144 may be used to store data for the controller 130 and the memory device 150 to perform operations such as read operations or program/write operations.

The memory 144 may be implemented as a volatile memory. The memory 144 may be implemented with a static random-access memory (SRAM), a dynamic random-access memory (DRAM), or both. Although FIG. 2 illustrates, as an example, that the second memory 144 is disposed within the controller 130, embodiments are not limited thereto. That is, the memory 144 may be disposed within or external to the controller 130. For instance, the memory 144 may be embodied by an external volatile memory having a memory interface transferring data and/or signals between the memory 144 and the controller 130.

The memory 144 can store data for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control overall operation of the memory system 110. By way of example but not limitation, the processor 134 controls a program operation or a read operation of the memory device 150, in response to a write request or a read request received from the host 102. In accordance with an embodiment, the processor 134 may use or execute firmware to control overall operation of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is received from the host 102, with a physical address of the memory device 150 through the map data. The memory device 150 may operate like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 can handle instructions or commands corresponding to a command received from the host 102. The controller 130 can perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data stored in a memory block among the memory blocks 152, 154, 156 and storing such data in another memory block, e.g., a garbage collection (GC) operation. The background operation can include moving data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands received from the host 102. For example, when performing program operations corresponding to program commands, read operations corresponding to read commands, and erase operations corresponding to erase commands, such operations may be performed sequentially, i.e., in groups of particular type of command, randomly, or alternately, i.e., alternate between the different types of commands, the controller 130 can determine which channel(s) or way(s) among a plurality of channels or ways for connecting the controller 130 to a plurality of memory dies included in the memory 150 is/are proper or appropriate for performing each operation. The controller 130 can transmit data or instructions via determined channels or ways for performing each operation. The plurality of memory dies in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command received from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered to. The controller 130 can refer to descriptors delivered from the memory device 150. The descriptors can include a block or page of parameters that describe relevant information about the memory device 150. For instance, the descriptors may include device descriptors, configuration descriptors, unit descriptors, and the like. Each descriptor is data which may have a set format or structure. The controller 130 can refer to, or use, the descriptors to determine which channel(s) or way(s) an instruction or a data is exchanged on.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
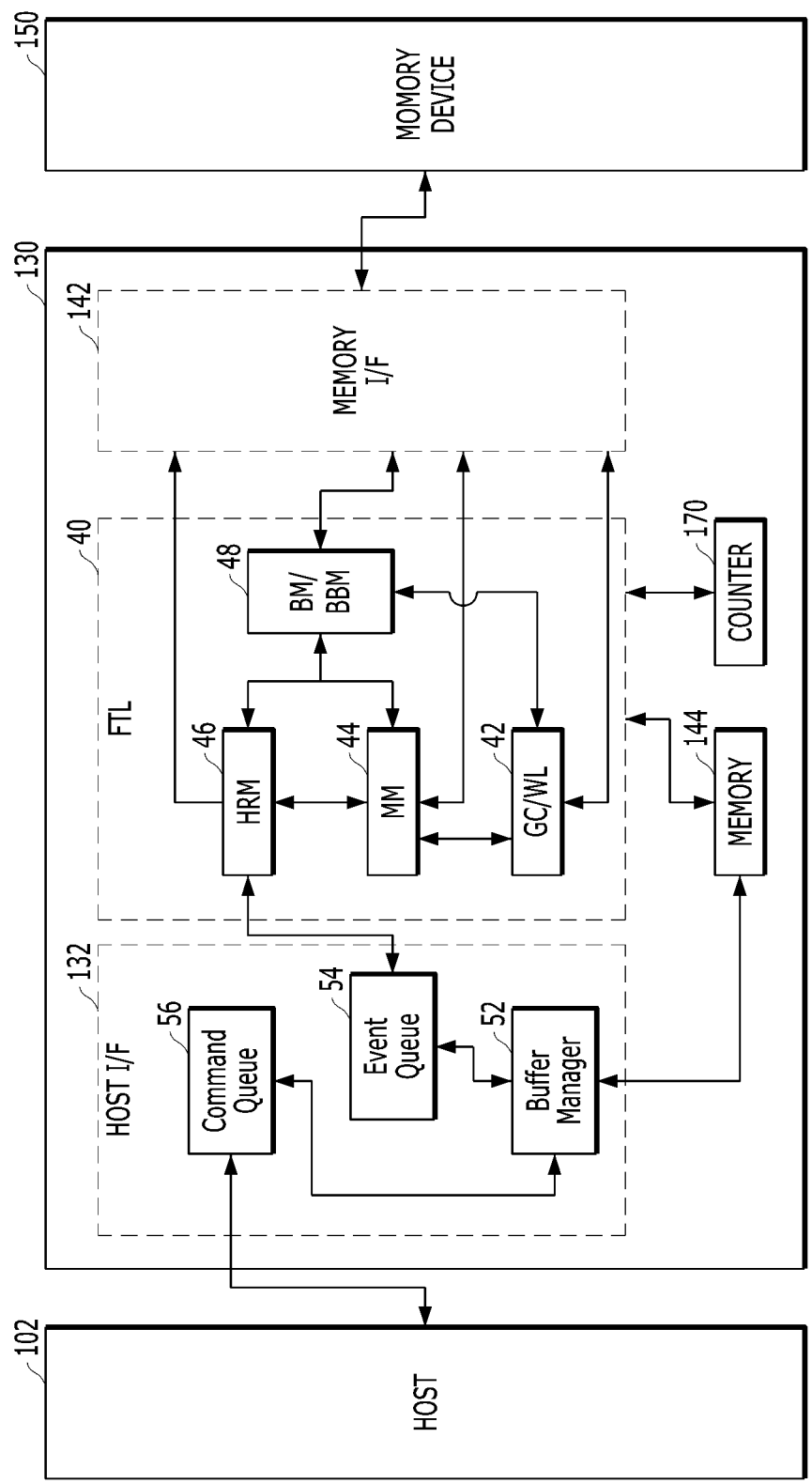
FIG. 3 is a schematic diagram illustrating a data processing system in accordance with another embodiment of the present invention.

Referring to FIG. 3, a controller in a memory system in accordance with another embodiment of the present disclosure is described. The controller 130 cooperates with the host 102 and the memory device 150. As illustrated, the controller 130 includes a host interface 132, a flash translation layer (FTL) 40, as well as the host interface 132, the memory interface 142, and the memory 144 previously identified in connection with FIG. 2.

Although not shown in FIG. 3, in accordance with an embodiment, the ECC component 138 described with reference to FIG. 2 may be included in the flash translation layer (FTL) 40. In another embodiment, the ECC component 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54. The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be transmitted, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like to the flash translation layer (FTL) 40. The event queue 54 receives events from the buffer manager 52, which are to be internally executed and processed by the memory system 110 or the controller 130 in response to the commands, the data, and the like transmitted from the host 102, so as to deliver the events into the flash translation layer (FTL) 40 in the order received.

In accordance with an embodiment, the host interface 132 described with reference to FIG. 3 may perform some functions of the controller 130 described with reference to FIGS. 1 and 2. The host interface 132 may set the host memory 106, which is shown in FIG. 6 or 9, as a controlled device and add the host memory 106 as an additional storage space which is controllable or usable by the controller 130.

In accordance with an embodiment, the flash translation layer (FTL) 40 can include a host request manager (HRM) 46, a map manager (MM) 44, a state manager (GC/WL) 42, and a block manager (BM/BBM) 48. The host request manager 46 can manage the events received from the event queue 54. The map manager 44 can handle or control a map data. The state manager 42 can perform garbage collection (GC) or wear leveling (WL). The block manager 48 can execute commands or instructions onto a block in the memory device 150.

By way of example but not limitation, the host request manager) 46 can use the map manager 44 and the block manager 48 to handle or process requests according to the read and program commands, and events which are delivered from the host interface 132. The host request manager 46 can transmit an inquiry request to the map data manager 44, to determine a physical address corresponding to the logical address which is entered with the events. The host request manager 46 can transmit a read request with the physical address to the memory interface 142, to process the read request (handle the events). On the other hand, the host request manager 46 can transmit a program request (write request) to the block manager 48, to program data to a specific empty page (a page with no data) in the memory device 150, and then, can transmit a map update request corresponding to the program request to the map manager 44, to update an item relevant to the programmed data in information of mapping the logical-physical addresses to each other.

Here, the block manager 48 can convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and transmit flash program requests for multiple-plane and one-shot program operations to the memory interface 142. In an embodiment, the block manager 48 transmits several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary or should be performed. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 may check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 transmits a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may transmit a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager 46 can program the latest version of the data for the same logical address of the page and currently issue an update request. When the status manager 42 requests the map update in a state in which copying of valid page(s) is not properly completed, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44, or the block manager 48 can include circuitry for performing its own operation. As used in the present disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term 'circuitry' also covers an implementation of merely a processor (or multiple processors) or portion of a processor and its (or their) accompanying software and/or firmware. The term 'circuitry' also covers, for example, and if applicable to a particular claim element, an integrated circuit for a storage device.

The memory device 150 can include a plurality of memory blocks. The plurality of memory blocks can be any of different types of memory blocks such as single-level cell (SLC) memory blocks, multi-level cell (MLC) memory blocks, or the like, according to the number of bits that can be stored or represented in one memory cell. Here, the SLC memory block includes a plurality of pages implemented by memory cells each storing one bit of data. The SLC memory block can have high data I/O operation performance and high durability. The MLC memory block includes a plurality of pages implemented by memory cells each storing multi-bit data (e.g., two bits or more). The MLC memory block can have greater storage capacity for the same space compared to the SLC memory block. The MLC memory block can be highly integrated in terms of storage capacity. In an embodiment, the memory device 150 may be implemented with any of different levels of MLC memory blocks, such as double-level memory blocks, triple-level cell (TLC) memory blocks, quadruple-level cell (QLC) memory blocks, or a combination thereof. The double-level memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with memory blocks including a plurality of pages implemented by memory cells, each capable of storing five or more bits of data.

In an embodiment of the present disclosure, the memory device 150 is embodied as nonvolatile memory such as a flash memory such as a NAND flash memory, a NOR flash memory, and the like. Alternatively, the memory device 150 may be implemented by at least one of a phase change random access memory (PCRAM), a ferroelectrics random access memory (FRAM), a spin injection magnetic memory (SU-RAM), and a spin transfer torque magnetic random access memory (STT-MRAM), or the like.

Figure 4:
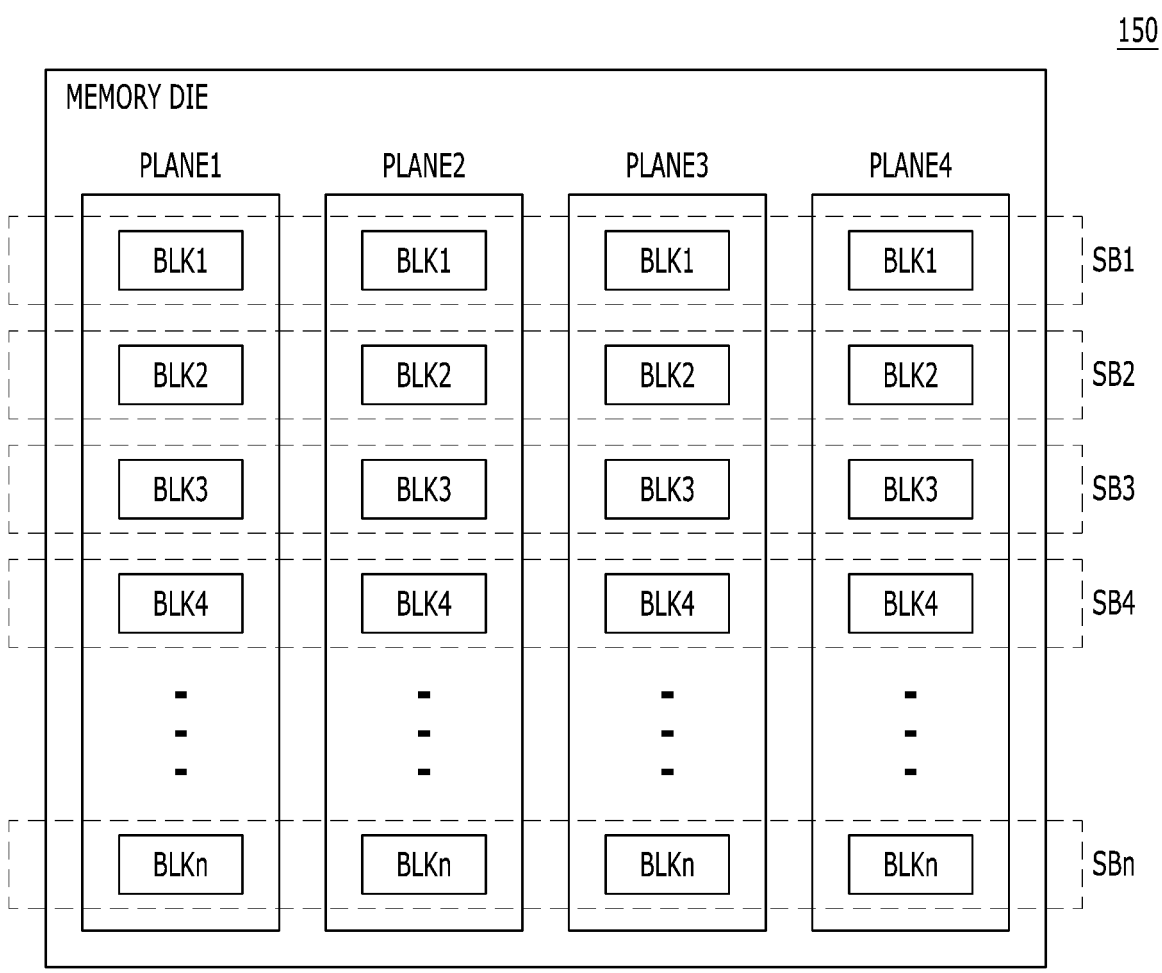
FIG. 4 is a diagram illustrating an example of the memory device illustrated in FIGS. 2 and 3.

FIG. 4 is a diagram illustrating a configuration of the memory device 150 of FIGS. 2 and 3. By way of example, the memory device 150 of FIG. 4 includes one memory die, which includes four planes PLANE1 to PLANE4.

Referring to FIG. 4, the memory device 150 may include first to fourth planes PLANE1 to PLANE4, each of which may include a plurality of memory blocks BLK, for example, n memory blocks BLK1 to BLKn. Here, n may be a natural number equal to or more than 1.

Memory blocks BLK at the same locations in the first to fourth planes PLANE1 to PLANE4 may be part of one memory block group, denoted a super block SB. For example, the controller 130 may group first memory blocks BLK1 of the first to fourth planes PLANE1 to PLANE4 to form a first super block SB1. Since each of the first to fourth planes PLANE1 to PLANE4 includes n memory blocks BLK1 to BLKn, the memory device 150 may include first to nth super blocks SB1 to SBn. A data program operation and a data read operation may be performed on the first to nth super blocks SB1 to SBn in an interleaving manner.

Figure 5:
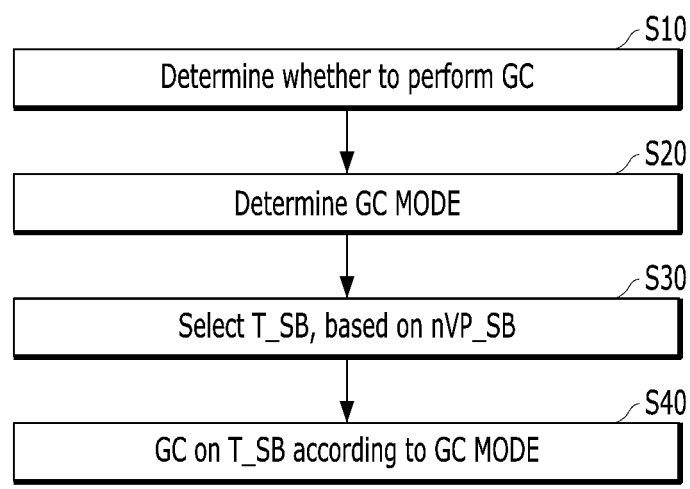
FIG. 5 is a flowchart illustrating an example of a method for selecting a Garbage Collection (GC) mode in accordance with an embodiment.
Figure 6A:
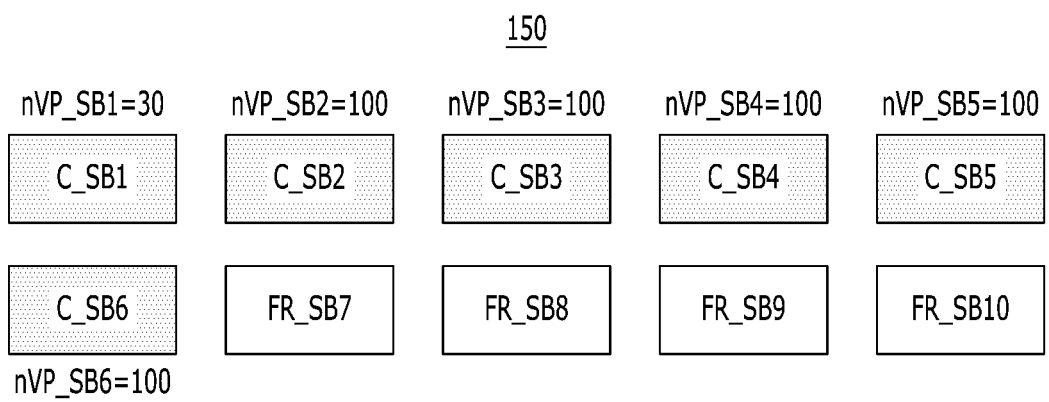
FIGS. 6A and 6B are diagrams illustrating states of the memory device in accordance with an embodiment.
Figure 6B:
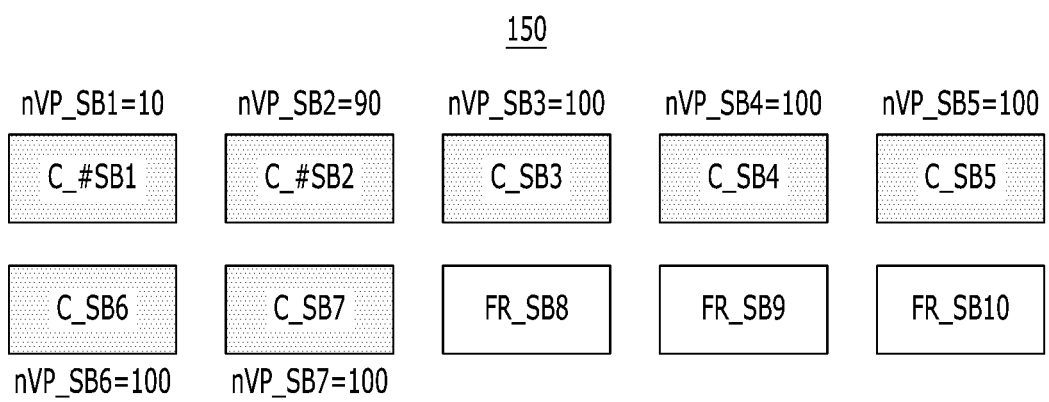

FIG. 5 illustrates an example of a process in which the controller 130 in accordance with the present embodiment determines a GC mode. FIGS. 6A and 6B illustrate states of the memory device 150 in accordance with the present embodiment.

Hereafter, an example of a method in which the controller 130 in accordance with the present embodiment selects the GC mode based on the state of the memory device 150 (for example, an invalidation level or rate of the memory device) is described with reference to FIGS. 5, 6A and 6B.

The controller 130 determines to perform GC in various cases, of which FIG. 5 illustrates the case in which the controller 130 determines to perform GC because the number of free super blocks FR_SB in the memory device 150 is too low, i.e., the available free space is insufficient. However, the present embodiment is not limited thereto.

Referring to S10 of FIG. 5, the controller 130 may determine whether to perform GC, based on the number of free super blocks FR_SB in the memory device 150. As illustrated in FIG. 6A, the memory device 150 may include '10' super blocks. Among the 10 super blocks, six super blocks C_SB1 to C_SB6 may be closed super blocks, indicating that each such block has been completely programmed. The remaining four super blocks FR_SB7 to FR_SB10 may be free super blocks to which new data can be programmed. In the following description, 'C_SB' represents a closed super block, and 'FR_SB' represents a free super block.

It is assumed that the set number for determining whether to perform GC is '3'. As illustrated in FIG. 6B, the number of the free super blocks FR_SB is '4'. Accordingly, the controller 130 may determine to not perform GC on the memory device.

Then, when a data program operation is performed on the free super block FR_SB7, the free super block FR_SB7 is changed to a closed super block C_SB7 as illustrated in FIG. 6B. Thus, the number of free super blocks FR_SB in the memory device 150 is reduced to '3'. Thus, the controller 130 may determine to perform GC and further determine the mode in which the GC is to be performed on the memory device 150. The GC mode in accordance with the present embodiment may include a first mode and a second mode.

In the first GC mode, the priorities of the copy operation is differently set based on the second valid-page decrease amount $\Delta VP\_BLK$ of the respective memory blocks BLK in the target super block T_SB. In the first GC mode, the priority of a second copy operation performed on the second target block BLK_T2 may be set to lower than the priority of a first copy operation performed to the first target block BLK_T1. The second target block BLK_T2 has a second valid-page decrease amount $\Delta VP\_BLK$ greater than the first target block BLK_T1.

That is, in the first GC mode, the second copy operation may be performed later than the first copy operation. Furthermore, during the first GC mode, the second copy operation may be performed in a threshold time after the first copy operation is completely performed. Thus, during an execution time of the first copy operation and the threshold time, at least some of the valid pages included in the second target block BLK_T2 may be invalidated. Therefore, the number of valid pages on which the second copy operation needs to be performed in the second target block BLK_T2 may be reduced.

In the second GC mode, a copy operation for valid data stored in the target super block T_SB is performed without consideration of the first valid-page decrease amount $\Delta VP\_SB$ of the target super block T_SB. Therefore, during the second GC mode, the number of valid pages on which the copy operation needs to be performed may be more than in the first GC mode. However, the second GC mode does not include the threshold time which the valid pages in the second target block BLK_T2 are invalidated. Accordingly, the time to perform the second GC mode may be reduced more than in the first GC mode.

When determining to perform GC, the controller 130 may determine the mode of the GC, based on one or more of a valid-page decrease amount of the memory device 150, the number of erased pages in the super blocks SB, and the size of data on which a program operation is to be performed.

In the present embodiment, the controller 130 may determine whether to perform GC, based on the valid-page decrease amount of the memory device 150 and the number of erased pages in the memory device 150. For example, when the total valid-page decrease amount of the super blocks SB1 to SB7 which have been completely programmed is less than the number of erased pages included in the memory device 150, the controller 130 may not urgently perform GC. Thus, the controller 130 may determine to perform the first GC mode which includes a waiting time (threshold time) of the copy operation even though the number of valid pages on which the copy operation of valid data is performed is decreased.

On the other hand, when the total valid-page decrease amount of the super blocks SB1 to SB7 which have been completely programmed is greater than the number of erased pages in the memory device 150, the controller 130 needs to urgently perform GC. Thus, the controller 130 may determine to perform the second GC mode which does not include the waiting time of the copy operation, even though the number of valid pages on which the copy operation of valid data is performed is not decreased.

Referring to S30 of FIG. 5, the controller 130 may select the target super block T_SB on which the GC is to be performed based on the first valid page count nVP_SB of the super blocks SB, in operation S30. That is, as illustrated in FIG. 6B, the controller 130 may select the first super block SB1 whose first valid page count nVP_SB is equal to or less than a target value (for example, '30'), as the target super block T_SB. Also, the controller 130 may select the first super block SB1 having the smallest first valid page count nVP_SB of '10', as the target super block T_SB.

Then, the controller 130 may perform GC on the target super block T_SB selected in operation S30, based on the GC mode determined in operation S20, in operation S40.

FIG. 7 illustrates an example of a method in which the controller 130 performs the first GC mode, which has been described with reference to FIGS. 5, 6A and 6B.

In operation S200, the controller 130 may sort the plurality of memory blocks BLK included in the target super block T_SB into the first and second target blocks BLK_T1 and BLK_T2, based on the second valid-page decrease amount ΔVP_BLK of the respective memory blocks BLK.

The second valid-page decrease amount ΔVP_BLK of the first target block BLK_T1 is less than a reference value. The second valid-page decrease amount ΔVP_BLK of the second target block BLK_T2 is equal to or more than the reference value. The first target block BLK_T1 may be highly unlikely to be invalidated. The second target block BLK_T2 may be highly likely to be invalidated. The second target block BLK_T2 may have a relatively high second valid-page decrease amount ΔVP_BLK among the plurality of memory blocks.

In operation S210, the controller 130 may copy valid data from the first target block BLK_T1 to a free super block FR_SB or an open super block OP_SB capable of storing data therein (first copy operation). The controller 130 may further update meta data by the first copy operation.

Hereinafter, the second valid page count nVP_BLK of the second target block BLK_T2 may be denoted as 'nVP_BLK_T2'.

In operation S215, the controller 130 may check the second valid page count nVP_BLK_T2 after the first copy operation is completed. The controller 130 may determine whether or not the second valid page count nVP_BLK_T2 is '0', in operation S220.

When the determination result of operation S220 indicates that the second valid page count nVP_BLK_T2 is '0' (YES in operation S220), the controller 130 may end the first GC mode without performing the second copy operation for the valid data stored in the second target block BLK_T2. The controller 130 may determines the target super block T_SB as an erase target super block. That is, during the first period in which the first copy operation of operation S210 is performed, all valid pages in the second target block BLK_T2 may be invalidated. Thus, since the controller 130 does not need to perform the second copy operation on the second target block BLK_T2. The burden of the second copy operation on the second target block BLK_T2 can be reduced. Furthermore, the time required for the GC operation of the target super block T_SB on which the GC can be reduced.

When the determination result of operation S220 indicates that the second valid page count nVP_BLK_T2 is not '0', the controller 130 may wait to perform the second copy operation, until the second valid page count nVP_BLK_T2 becomes '0'. In this case, the GC performed on the second target block BLK_T2 may be delayed by the waiting time.

Thus, when the second valid page count nVP_BLK_T2 is not '0' (NO in operation S220), the controller 130 may determine whether the trigger condition of the second copy operation is met, in operation S230.

The second copy operation may be triggered when at least one of the following conditions is met. The first condition indicates whether the number of valid pages included in the second target block BLK_T2 is equal to or more than 1 and less than a threshold value threshold value. The second condition indicates whether the waiting time after the completion of the first copy operation is performed is equal to or more than the threshold time. The third condition indicates whether a decrease amount of valid pages of the memory device 150 during the first copy operation is equal to or more than the threshold amount.

That is, the controller 130 may wait to perform the second copy operation only until the second valid page count nVP_BLK_T2 reaches the threshold value. Then the controller 130 may perform the second copy operation to the second target block BLK_T2 having valid pages less or equal to the threshold value.

Furthermore, the controller 130 may wait to perform the second copy operation only until the waiting time reaches the threshold time after the first copy operation is completed. That is, the controller 130 may perform the second copy operation on valid pages included in the second target blocks BLK_T2 after the threshold time elapses after the first copy operation is completed. Then, the controller 130 may perform the second copy operation when the waiting time becomes equal to or more than the threshold time. When a decrease amount of the valid pages in the memory device 150 is equal to or more than the threshold amount while the first copy operation is performed, the controller 130 may perform the second copy operation.

That is, the controller 130 in accordance with the present embodiment may dynamically set the threshold value, the threshold time and the threshold amount and thus adjust the time at which the second copy operation is to be performed. Accordingly, the times required for the first and second copy operations fall within a specific range. Thus, it is possible to reduce overhead which occurs when GC is performed.

When the determination result of operation S230 indicates that the trigger condition is not met (NO in operation S230), the controller 130 returns to operation S215.

When the determination result of operation S230 indicates that the trigger condition is met (YES in operation S230), the controller 130 copies the valid data from the second target block BLK_T2 in operation S240 (second copy operation). The second copy operation of operation S240 may include copying the valid data from the second target block BLK_T2 into the super block FR_SB or OP_SB, and updating the meta data of the super block FR_SB or OP_SB in which the copied valid data are stored. The controller 130 may determine the target super block T_SB as an erase target super block after the second copy operation is completed.

The second copy operation performed in operation S240 is not necessarily performed on all the valid pages of the second target block BLK_T2 determined in operation S200. The second copy operation may be performed on valid pages existing at the time that the trigger condition of the second copy operation is met in operation S230. That is, the number of valid pages in the second target block BLK_T2, on which the second copy operation is to be performed in S240, may become less than the number of valid pages in the second target block BLK_T2 detected at operation S200. Thus, the burden by the second copy operation on the second target block BLK_T2 and the time required for the second copy operation of data can be reduced.

Hereafter, a process in which the controller 130 in accordance with the present embodiment performs the first GC mode is described in detail with reference to FIGS. 8 to 13.

Figure 8:
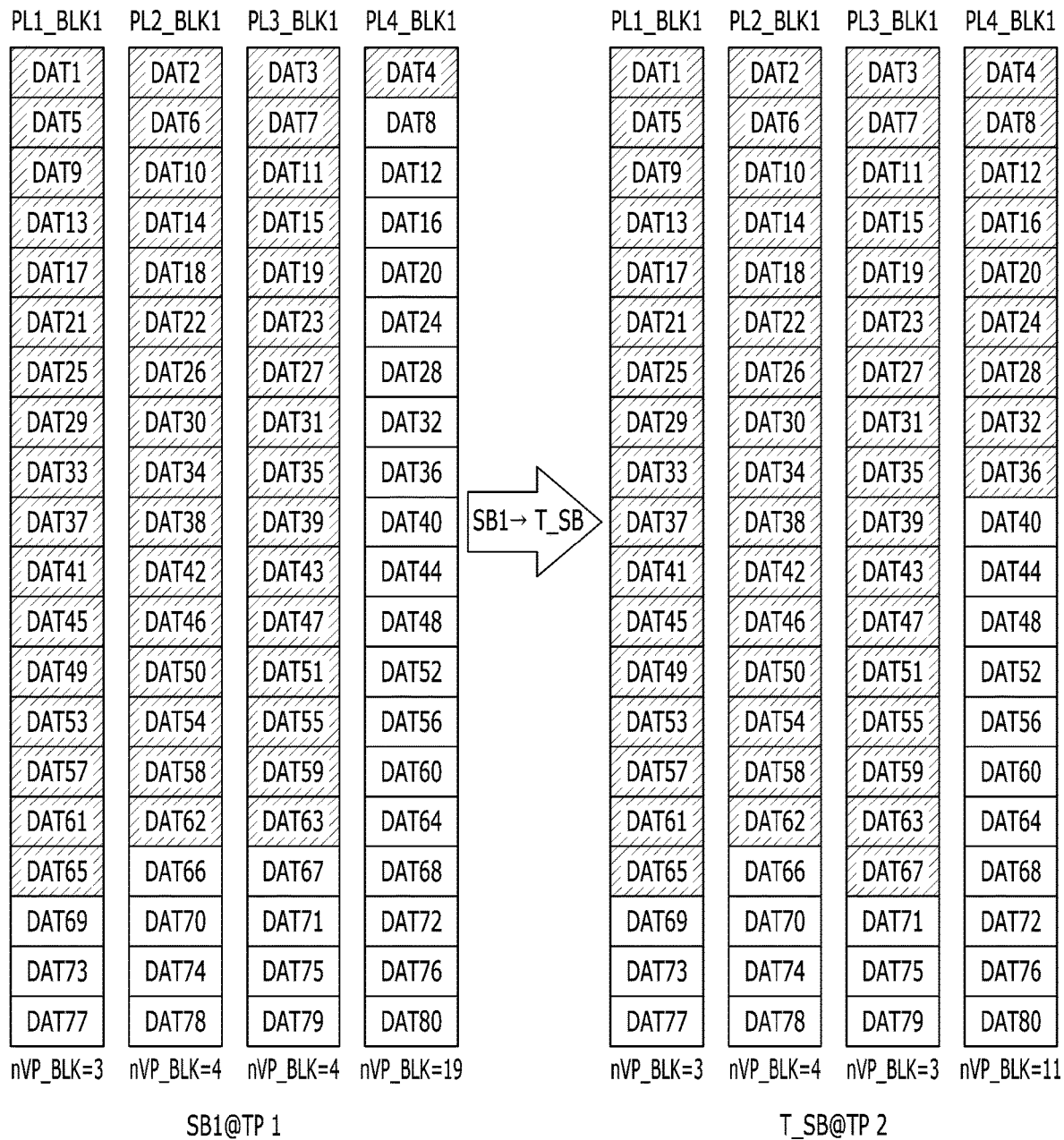
FIG. 8 is a diagram illustrating a method for selecting a target super block on which GC is to be performed.

FIG. 8 illustrates the state before the first super block SB1 is selected as a target super block T_SB1 and the state at the time at which the first super block SB1 is selected as the target super block T_SB1.

FIG. 9 illustrates the tables of the second valid page count nVP_BLK managed for each of the memory blocks and the second valid-page decrease amount ΔVP_BLK of each of the memory blocks.

Figure 10:
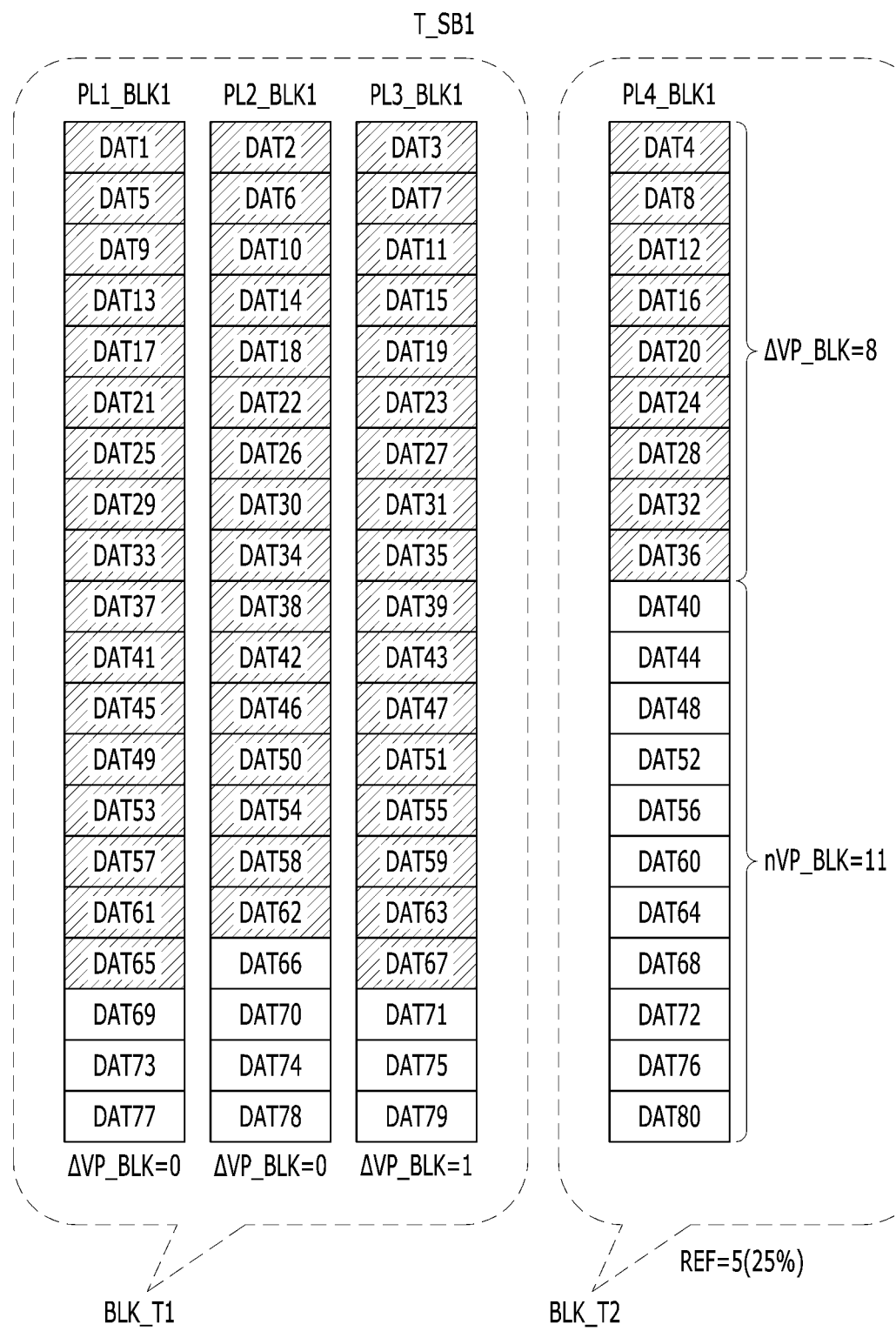
FIG. 10 is a diagram illustrating a method for sorting memory blocks in the target super block of FIG. 8 into first and second target blocks.

FIG. 10 illustrates an example in which each of the plurality of memory blocks in the target super block T_SB1 are designated as first or second target blocks BLK_T1 and BLK_T2 based on the second valid-page decrease amount ΔVP_BLK.

Figure 11:
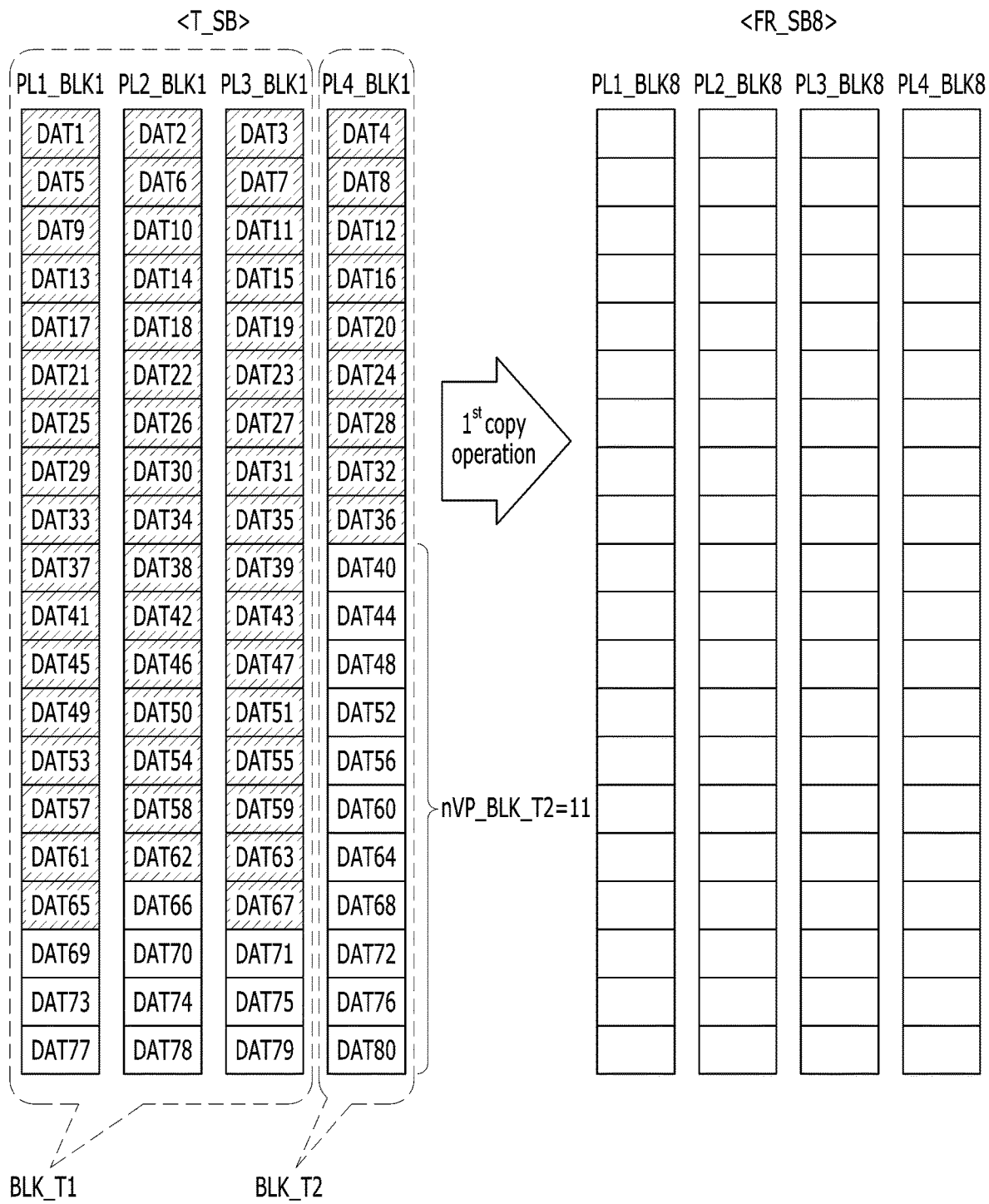
FIG. 11 is a diagram illustrating a data copying method which is performed on the first target block in the target super block of FIG. 8.

FIG. 11 illustrates a method for performing the first copy operation on the first target block BLK_T1 included in the target super block T_SB1.

Figure 12:
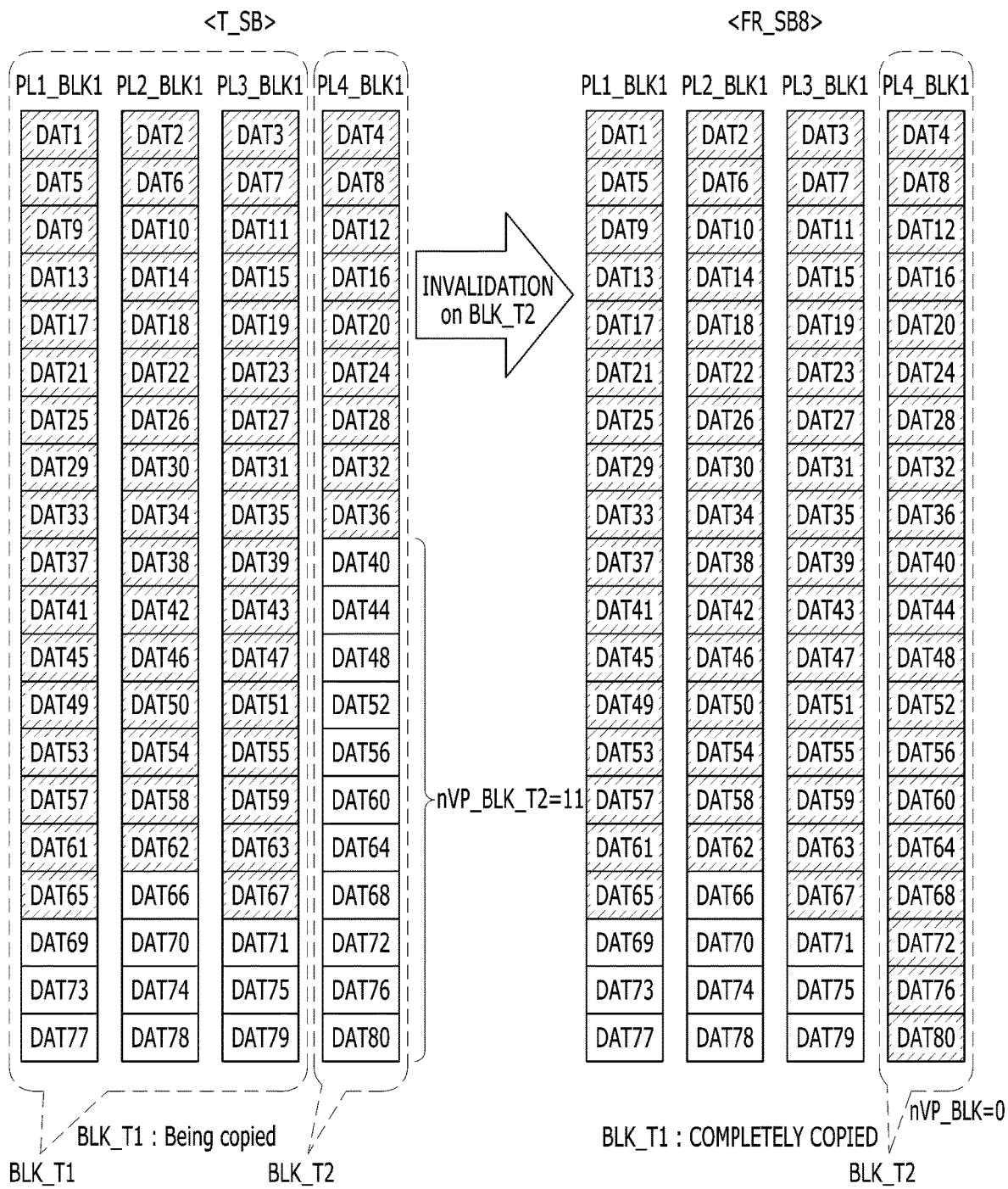
FIG. 12 is a diagram illustrating an example of a process of invalidating valid data migrated to the first target block of FIG. 11.

FIG. 12 illustrates a process of invalidating all valid data stored in the second target block BLK_T2.

Figure 13:
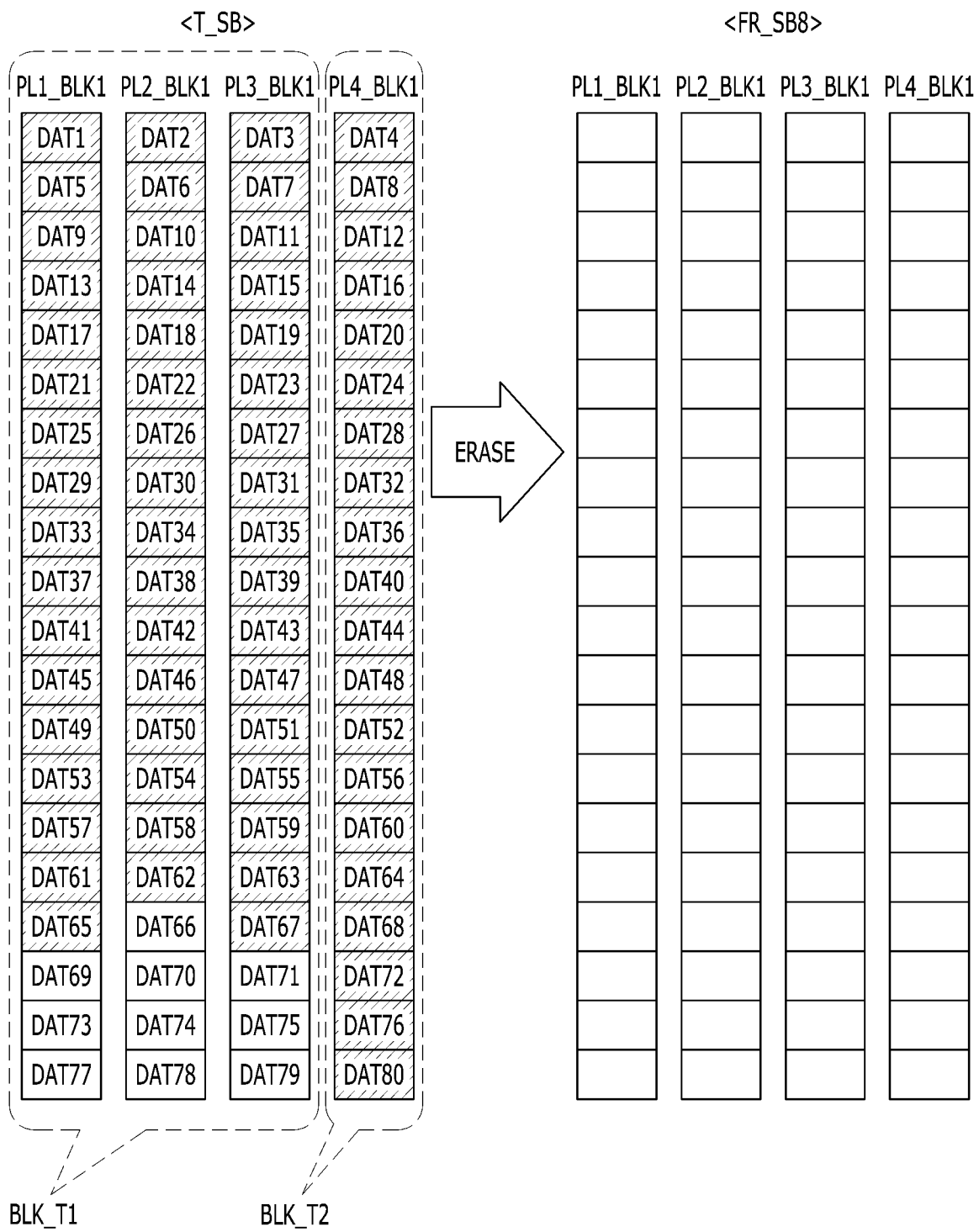
FIG. 13 is a diagram illustrating an example of a process of performing an erase operation of GC on the target super block of FIG. 11.

FIG. 13 illustrates a method for performing an erase operation on the first and second target blocks BLK_T1 and BLK_T2.

Referring to FIG. 8, the first super block SB1 may include four memory blocks, i.e. the first memory block BLK1 of the first plane PLANE1, the first memory block BLK1 of the second plane PLANE2, the first memory block BLK1 of the third plane PLANE3 and the first memory block BLK1 of the fourth plane PLANE4.

Hereafter, for convenience of description, the first memory block BLK1 of the first plane PLANE1 will be referred to as 'first block PL1_BLK1', the first memory block BLK1 of the second plane PLANE2 will be referred to as 'second block PL2_BLK1', the first memory block BLK1 of the third plane PLANE3 will be referred to as 'third block PL3_BLK1', and the first memory block BLK1 of the fourth plane PLANE4 will be referred to as 'fourth block PL4_BLK1'. The first to fourth blocks PL1_BLK1 to PL4_BLK1 may be memory blocks which are physically independent of one another. Each of the first to fourth blocks PL1_BLK1 to PL4_BLK1 may include '20' pages. The first super block SB1 may be a closed super block which includes '80' pages and has been completely programmed. The controller 130 may select the first super block SB1 as the target super block T_SB1 according the first valid page count nVP_SB of the super blocks.

As illustrated in the left table of FIG. 9, the second valid page count nVP_BLK of the PL1_BLK1 may be '3', the second valid page count nVP_BLK of the PL2_BLK1 may be '4', the second valid page count nVP_BLK of the PL3_BLK1 may be '4', and the second valid page count nVP_BLK of the PL4_BLK1 may be '19', at a first time point TP1. That is, the first super block SB1 may include '30' valid pages and '50' invalid pages.

When the first valid page count nVP_SB of the super block SB, which is used to determine the target super block T_SB1, is set to '24 (30%)', the controller 130 may not select the first super block SB1 as the target super block T_SB1. Because the first valid page count nVP_SB of the super block SB is '30' and equal to or more than 24 (30%).

Then, as illustrated in the right table of FIG. 9, if one valid page in the PL3_BLK1 and eight valid pages in the PL4_BLK1 are invalidated, the first super block SB1 may include '21' valid pages and '59' invalid pages at a second time point TP2. Since '21' is less than '24 (30%)', the controller 130 may select the first super block SB1 as the target super block T_SB1 at the second time point TP2.

The first time point TP1 and the second time point TP2 are times at which the controller 130 determines whether to perform GC. The first time point TP1 occurs before the second time point TP2.

When the first super block SB1 is selected as the target super block T_SB1 at the second time point TP2, the controller 130 may calculate the second valid-page decrease amount ΔVP_BLK of each of the first to fourth blocks PL1_BLK1 to PL4_BLK1 in the target super block T_SB1 as illustrated in FIG. 9. The second valid-page decrease amount ΔVP_BLK may be calculated by subtracting the second valid page count nVP_BLK at the second time point TP2, from the second valid page count nVP_BLK at the first time point TP1. Thus, at the second time point TP2, the controller 130 may determine that the valid page count of the third block PL3_BLK1 has decreased by one (−1) and the valid page count of the fourth block PL4_BLK1 has decreased by eight (−8), compared to the first time point TP1.

The controller 130 in accordance with the present embodiment may calculate the second valid page count nVP_BLK of each of the memory blocks PL1_BLK1 to PL4_BLK1 whenever determining to perform GC (for example, at TP1 and at TP2).

At the second time point TP2, the controller 130 may calculate the second valid-page decrease amount ΔVP_BLK of the each of the memory blocks PL1_BLK1 to PL4_BLK1, based on the second valid page counts nVP_BLK of each of the memory blocks PL1_BLK1 to PL4_BLK1 which have been recently calculated N times (two times TP1 and TP2 in this case). In this example, N is a natural number equal to or more than 2.

In other words, the controller 130 in accordance with the present embodiment may calculate the second valid page count nVP_BLK of each of the memory blocks PL1_BLK1 to PL4_BLK1 (3, 4, 4 and 19, respectively) at the first time point TP1 and the second valid page count nVP_BLK of each of the memory blocks PL1_BLK1 to PL4_BLK1 (3, 4, 3 and 11, respectively) at the second time point TP2. The controller 130 may calculate the second valid-page decrease amount ΔVP_BLK of each of the blocks PL1_BLK1 to PL4_BLK1 (0, 0, 1 and 8, respectively), based on the second valid page count nVP_BLK of each of the memory blocks PL1_BLK1 to PL4_BLK1 (i.e., 3, 4, 3 and 11 at the second time point TP2 and 3, 4, 4 and 19 at the first time point TP1).

As illustrated in FIG. 10, the controller 130 may sort the plurality of blocks PL1_BLK1 to PL4_BLK1 into the first and second target blocks BLK_T1 and BLK_T2, based on the second valid-page decrease amount ΔVP_BLK of each of the blocks PL1_BLK1 to PL4_BLK1 in the target super block T_SB1. In particular, the controller 130 may determine the fourth block PL4_BLK1 as the second target block BLK_T2. The fourth block PL4_BLK1 has decrease valid-page decrease amount ΔVP_BLK of '8', which is the greatest among blocks PL1_BLK1 to PL4_BLK1. The controller 130 may determine the first to third blocks PL1_BLK1 to PL3_BLK1 as the first target blocks BLK_T1.

The controller 130 may detect, as the second target block BLK_T2, the fourth block PL4_BLK1 having the second valid-page decrease amount ΔVP_BLK of '8', which is equal to or more than a reference value REF (for example, 25% or 5). The controller 130 may detect, as the first target blocks BLK_T1, the first to third blocks PL1_BLK1 to PL3_BLK1, whose second valid-page decrease amount ΔVP_BLK are less than the reference value REF.

As illustrated in FIG. 11, the controller 130 may copy the valid data from the first to third blocks PL1_BLK1 to PL3_BLK1 to the eighth free super block FR_SB8 (first copy operation). Because the valid data in the first to third blocks PL1_BLK1 to PL3_BLK1 has been all copied, the stability of the copied valid data can be maintained even though the first to third blocks PL1_BLK1 to PL3_BLK1 are all invalidated.

As illustrated in FIG. 12, after the first copy operation for the valid data from the first target blocks BLK_T1 (=PL1_BLK1 to PL3_BLK1) is completed, the controller 130 checks the second valid page count nVP_BLK of the second target block BLK_T2 (=PL4_BLK1). Referring back to FIG. 11, the second target block BLK_T2 (=PL4_BLK1) includes '11' valid pages before the first copy operation is performed. However, as illustrated in FIG. 12, the '11' valid pages included in the second target block BLK_T2 (=PL4_BLK1) may be all invalidated while the first copy operation is performed. That is, as illustrated in the right table of FIG. 12, the second target block BLK_T2 (=PL4_BLK1) may include '0' valid pages after the first copy operation on the first target blocks BLK_T1 (=PL1_BLK1 to PL3_BLK1) is completed. Since the second target block BLK_T2 (=PL4_BLK1) includes no valid page, the controller 130 may not perform the second copy operation on the second target block BLK_T2 (=PL4_BLK1).

However, when the number of valid pages in the second target block BLK_T2 (=PL4_BLK1) is not '0' after the first copy operation is completed, the controller 130 may wait to perform the second copy operation on the second target block BLK_T2 (=PL4_BLK1) until the trigger condition of the second copy operation is met.

When the threshold value is '5' and the number of valid pages in the second target block BLK_T2 (=PL4_BLK1) is '8' after completion of the first copy operation, the controller 130 may wait to perform the second copy operation on the second target block BLK_T2 (=PL4_BLK1) until the number of valid pages in the fourth block PL4_BLK1 becomes less than the threshold value of '5'. Then, when the number of valid pages in the fourth block PL4_BLK1 becomes '4', the controller 130 may copy the valid data, from the four valid pages in the second target block BLK_T2 (=PL4_BLK1), into the eighth free super block FR_SB8. The controller 130 does not perform the second copy operation on all '11' valid pages which are all the valid pages of the second target block BLK_T2 (=PL4_BLK1) illustrated in FIG. 11 (second GC mode). The controller 130 may perform the second copy operation on '4' valid pages less than the threshold value of '5'. Thus, the burden of the second copy operation on the second target block BLK_T2 can be reduced as many as 7 invalidated pages.

Thus, the burden of the second copy operation on the second target block BLK_T2 can be reduced as many as the invalidated pages during the combined time of the first copy operation and the waiting time.

When the threshold time is 5 minutes, the controller 130 may wait to perform the second copy operation until five minutes elapses after the first copy operation for the first target blocks BLK_T1 (=PL1_BLK1 to PL3_BLK1) is completed. Then, the controller 130 copies valid data from the valid pages in the fourth block PL4_BLK1 into the eighth free super block FR_SB8. The controller 130 does not perform the second copy operation on all 11 valid pages which are all the valid pages of the second target block BLK_T2 (=PL4_BLK1) illustrated in FIG. 11. The controller 130 does not perform the second copy operation on invalidated pages during the threshold time. Thus, the burden of the second copy operation on the second target block BLK_T2 can be reduced as many as the invalidated pages during the combined time of the first copy operation and the waiting time.

Then, as illustrated in FIG. 13, the controller 130 may perform an erase operation on the first target blocks BLK_T1 (=PL1_BLK1 to PL3_BLK1) and the second target block BLK_T2 (=PL4_BLK1). Therefore, the target super block T_SB1 on which the erase operation has been completed may become a free super block FR_SB.

Although various embodiments have been illustrated and described, it will be apparent to those skilled in the art that various changes and modifications may be made without departing from the spirit and scope of the invention as defined in the following claims.

What is claimed is:

1. An operation method of a controller, comprising:
   selecting a target super block whose a first valid page count is equal to or less than a target value, on which garbage collection (GC) is to be performed, among a plurality of super blocks which are completely programmed, when a determination to perform GC is made;
   calculating a second valid-page decrease amount of each of the memory blocks based on a first count that is the number of valid pages in the corresponding memory block when a determination to perform a current GC is made, and a second count that is the number of valid pages in the corresponding memory block when a determination to perform a previous GC is made;
   selecting a first target memory block among a plurality of memory blocks in the target super block, based on the second valid-page decrease amount of each of the memory blocks; and
   performing the first copy operation on valid pages in the first target memory block.

2. The operation method of claim 1, further comprising:
   checking a second valid page count of a second target memory block, among the plurality of memory blocks, after the first copy operation is completed.

3. The operation method of claim 2, further comprising:
   determining the target super block as an erase target super block, without performing a second copy operation on valid pages in the second target memory block, when the second valid page count of the second target memory block is '0'.

4. The operation method of claim 2, further comprising:
   performing a second copy operation on valid pages in the second target memory block after a threshold time elapses from completion of the first copy operation; and determining the target super block as an erase target super block.

5. The operation method of claim 4, wherein the second copy operation is performed when the second valid page count of the second target memory block is equal to or more than 1 and less than a threshold value.

6. The operation method of claim 3, further comprising performing an erase operation on the erase target super block.

7. The operation method of claim 2, wherein the second valid-page decrease amount of the first target block is less than the reference value, and the second valid-page decrease amount of the second target memory block is equal to or more than the reference value.

8. The operation method of claim 2, wherein, among the plurality of memory blocks, the second target memory block has the greatest second valid-page decrease amount.

9. An operation method of a memory system having memory device, comprising:
   selecting a target super block whose a first valid page count is equal to or less than a target value, on which a first garbage collection (GC) is to be performed, among a plurality of closed super blocks, when a determination to perform the GC is made;
   calculating a second valid-page decrease amount of each of the memory blocks based on a first count that is the number of valid pages in the corresponding memory block when a determination to perform a current GC is made, and a second count that is the number of valid pages in the corresponding memory block when a determination to perform a previous GC is made;
   designating each of a plurality of memory blocks on which a first copy operation is to be performed preferentially in the target super block as a first target memory block or a second target memory block based on a second valid-page decrease amount of each of the memory blocks, when an invalidation rate of valid pages in the memory device is less than a set value; and
   performing the first copy operation on the first target memory block before performing a second copy operation on the second target memory block.

10. The operation method of claim 9, further comprising determining the target super block as an erase target super block, without performing the second copy operation on valid pages in the second target memory block, when the second valid page count of the second target memory block is '0'.

11. The operation method of claim 9, further comprising:
    performing the second copy operation on valid pages in the second target memory block after a threshold time elapses from completion of the first copy operation; and
    determining the target super block as an erase target super block.

12. The operation method of claim 11, wherein the second copy operation is performed when the second valid page count of the second target memory block is equal to or more than 1 and less than a threshold value.

13. The operation method of claim 10, further comprising performing an erase operation on the erase target super block.

14. The operation method of claim 9, wherein the second valid-page decrease amount of the first target block is less than a reference value, and the second valid-page decrease amount of the second target memory block is equal to or more than the reference value.

15. The operation method of claim 9, wherein, among the plurality of memory blocks, the second target memory block has the highest valid-page decrease amount.

16. The operation method of claim 9, wherein the invalidation rate of valid pages in the memory device is determined based on one or more of a valid-page decrease of each of the super blocks, the number of programmable pages in free super blocks, and the size of data on which a program operation is to be performed.

17. The operation method of claim 9, further comprising:
    performing a copy operation on the target super block when the invalidation rate of valid pages in the memory device is greater than the set value; and
    determining the target super block as an erase target super block.

18. A memory system comprising:
    a memory device comprising a plurality of super blocks each including a plurality of memory blocks; and
    a controller suitable for selecting a first target memory block on which a first copy operation is to be performed preferentially among a plurality of memory blocks included in a target super block whose a first valid page count is equal to or less than a target value, on which garbage collection (GC) is to be performed, and performing the first copy operation on the first target memory block, when a determination to perform the GC is made,
    wherein the controller selects the first target memory block based on a second valid-page decrease amount of each of the plurality of memory blocks in the target super block,
    wherein the controller calculates the second valid-page decrease amount of each of the memory blocks based on a first count that is the number of valid pages in the corresponding memory block when a determination to perform a current GC is made, and a second count that is the number of valid pages in the corresponding memory block when a determination to perform a previous GC is made.

19. The memory system of claim 18, wherein the controller checks a second valid page count of a second target memory block, among the plurality of memory blocks, after the first copy operation is completed.

20. The memory system of claim 19, wherein the controller determines the target super block as an erase target super block, without performing a second copy operation on valid pages in the second target memory block, when the second valid page count of the second target memory block is '0'.

21. The memory system of claim 19, wherein the controller is further suitable for:
    performing a second copy operation on valid pages included in the second target memory block after a threshold time elapses from completion of the first copy operation; and
    determining the target super block as an erase target super block.

22. The memory system of claim 20, wherein the controller performs the second copy operation when the second valid page count of the second target memory block is equal to or more than 1 and less than a threshold value.

23. The memory system of claim 19, wherein the second valid-page decrease amount of the first target block is less than a reference value, and the second valid-page decrease amount of the second target memory block is equal to or more than the reference value.

24. The memory system of claim 19, wherein, among the plurality of memory blocks in the target super block, the second target memory block has the greatest valid-page decrease amount.

25. An operating method of a controller, the operating method comprising:

determining, within a super block whose a first valid page count is equal to or less than a target value, on which garbage collection (GC) is to be performed, one or more first target memory blocks on which a first garbage collection operation is to be performed preferentially and one or more second target memory blocks, based on the valid-page decrease rate of each of memory blocks included in the super block, the valid-page decrease amount is calculated based on a first count that is the number of valid pages in the memory blocks when a determination to perform a current GC is made, and a second count that is the number of valid pages in the corresponding memory block when a determination to perform a previous GC is made;

controlling a memory device to perform the first garbage collection operation on valid pages in the one or more first target memory blocks; and controlling the memory device to perform a second garbage collection operation on one or more valid pages, which remain in the one or more second target memory blocks at a set time after completion of the garbage collection operation on the one or more first target memory blocks, wherein each of the first target memory blocks has a valid-page decrease rate less than a threshold, and wherein each of the second target memory blocks has a valid-page decrease rate equal to or greater than the threshold.

* * * * *